(12) United States Patent
Nanavati et al.

(10) Patent No.: US 11,341,315 B2
(45) Date of Patent: May 24, 2022

(54) SYSTEMS AND METHODS FOR PRE-RENDERING HTML CODE OF DYNAMICALLY-GENERATED WEBPAGES USING A BOT

(71) Applicant: Walmart Apollo, LLC, Bentonville, AR (US)

(72) Inventors: Arpan Y. Nanavati, Castro Valley, CA (US); Jeffery Jawad McRiffey, Knoxville, TN (US); Alexander Grigoryan, San Jose, CA (US)

(73) Assignee: WALMART APOLLO, LLC, Bentonville, AR (US)

(*) Notice: Subject to any disclaimer, the term of this patent is extended or adjusted under 35 U.S.C. 154(b) by 434 days.

(21) Appl. No.: 16/264,509

(22) Filed: Jan. 31, 2019

(65) Prior Publication Data
US 2020/0250259 A1    Aug. 6, 2020

(51) Int. Cl.
G06F 16/957 (2019.01)
G06F 16/958 (2019.01)
G06F 8/71 (2018.01)
G06F 40/14 (2020.01)
G06F 3/0484 (2022.01)
H04L 67/02 (2022.01)
H04L 67/564 (2022.01)
H04L 67/568 (2022.01)
(Continued)

(52) U.S. Cl.
CPC ............ *G06F 40/14* (2020.01); *G06F 3/0484* (2013.01); *G06F 8/65* (2013.01); *G06F 8/71* (2013.01); *G06F 9/5083* (2013.01); *G06F 16/9574* (2019.01); *G06F 16/9577* (2019.01); *G06F 16/986* (2019.01); *H04L 67/02* (2013.01); *H04L 67/2819* (2013.01); *H04L 67/2842* (2013.01); *H04L 67/42* (2013.01)

(58) Field of Classification Search
CPC ..... G06F 16/9574; G06F 16/9577; G06F 8/71
See application file for complete search history.

(56) References Cited

U.S. PATENT DOCUMENTS

| 6,424,966 B1 * | 7/2002 | Meyerzon | G06F 16/951 707/610 |
| 7,769,742 B1 * | 8/2010 | Brawer | G06F 16/951 707/709 |

(Continued)

*Primary Examiner* — Scott T Baderman
*Assistant Examiner* — Mario M Velez-Lopez
(74) *Attorney, Agent, or Firm* — Bryan Cave Leighton Paisner LLP

(57) ABSTRACT

The system can using a bot to periodically visit one or more dynamically-generated webpages of a website and to automatically retrieve HTML code for the one or more dynamically-generated webpages of the website. The system can further include automatically storing, in a content delivery computer, the HTML code for the one or more dynamically-generated webpages, wherein automatically storing the HTML code transforms the one or more dynamically-generated webpages from a dynamic content format into a static content format such that the one or more dynamically-generated webpages are transformed into one or more pre-rendered webpages. Further, the system can automatically transmit from the content delivery computer for display on a computing device of the user, the HTML code as a pre-rendered webpage in real-time. Other embodiments are disclosed.

20 Claims, 8 Drawing Sheets

(51) Int. Cl.
*G06F 8/65* (2018.01)
*G06F 9/50* (2006.01)
*H04L 67/01* (2022.01)

(56) References Cited

U.S. PATENT DOCUMENTS

| | | |
|---|---|---|
| 8,464,349 B2 | 6/2013 | Yee et al. |
| 8,719,265 B1 * | 5/2014 | Bedrax-Weiss ........ G06F 16/951 |
| | | 707/736 |
| 8,805,965 B2 | 8/2014 | Day et al. |
| 9,298,455 B1 | 3/2016 | Kolam et al. |
| 9,307,007 B2 | 4/2016 | Kapadia et al. |
| 9,442,709 B1 | 9/2016 | Delker et al. |
| 10,860,674 B2 * | 12/2020 | Bosarge ............... G06F 16/9538 |
| 2003/0188009 A1 * | 10/2003 | Agarwalla ............... H04L 67/02 |
| | | 709/236 |
| 2003/0191737 A1 * | 10/2003 | Steele .................... G06F 16/951 |
| 2005/0165778 A1 * | 7/2005 | Obata .................... G06F 16/951 |
| 2009/0119329 A1 * | 5/2009 | Kwon .................... G06F 16/957 |
| 2011/0055683 A1 | 3/2011 | Jiang |
| 2014/0068413 A1 * | 3/2014 | Christensen ............... G06F 8/34 |
| | | 715/234 |
| 2014/0310392 A1 | 10/2014 | Ho |
| 2016/0344832 A1 | 11/2016 | Kukreja et al. |
| 2017/0109797 A1 | 4/2017 | Boffa et al. |
| 2017/0262545 A1 * | 9/2017 | Qu ....................... G06F 16/9535 |
| 2018/0032491 A1 * | 2/2018 | Heo ........................ G06F 16/95 |
| 2018/0069945 A1 | 3/2018 | Graham-Cumming et al. |
| 2019/0034441 A1 * | 1/2019 | Capon .................... G06F 40/169 |
| 2019/0303500 A1 | 10/2019 | Mathews |
| 2020/0184278 A1 * | 6/2020 | Zadeh .................... G06F 16/43 |

* cited by examiner

400

401 – Using a bot to periodically visit a dynamically-generated webpage to retrieve HTML code of a dynamically-generated webpage of a website

402 – Automatically storing in a content delivery server the HTML code of the dynamically-generated webpage in a content delivery computer to transform the dynamically-generated webpage from a dynamic content format to a static content format

403 – Receiving a first request from a computing device of a user to view a first requested webpage

404 – Searching the content delivery computer to identify a match between the first requested webpage and a first pre-rendered webpage

405 – Upon identifying the a match between the first requested webpage and the first pre-rendered webpage, automatically transmitting the HTML code in static format to the computing device of the user

406 – When searching the content delivery computer does not identify the match, using a server-side rendering process to facilitate displaying, on the computing device of the user, a dynamically-generated webpage

407 – When searching the content delivery computer does not identify the match, using a client-side rendering process to facilitate displaying, on the computing device of the user, a dynamically-generated webpage

Pre-rendering

SYSTEMS AND METHODS FOR PRE-RENDERING HTML CODE OF DYNAMICALLY-GENERATED WEBPAGES USING A BOT

TECHNICAL FIELD

This disclosure relates generally to pre-rendering HTML code of dynamically-generated webpages using a bot.

BACKGROUND

Conventional approaches for downloading a webpage for display on a computing device can take too long to complete due to the complexity of computer-run processes run for each webpage, such as a server-side process or a client-side process, which causes a viewer of the webpage to have to wait for the webpage to download and display. Moreover, each time another webpage is requested, a web server initiates the same computer-run process each and every time for each page requested from a user.

BRIEF DESCRIPTION OF THE DRAWINGS

To facilitate further description of the embodiments, the following drawings are provided in which:

FIG. 4 illustrates a flow chart for a method, according to an embodiment;

Figure 1:
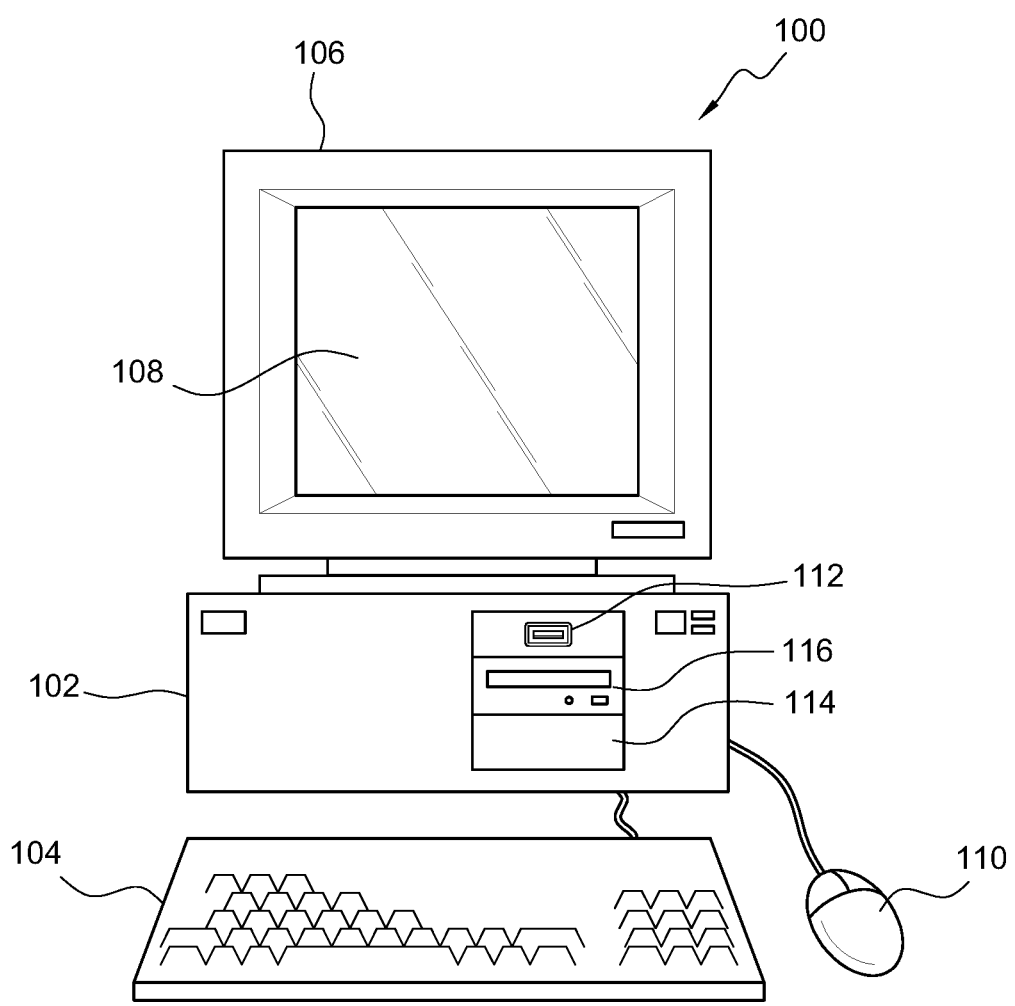
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately 0.5 second, one second, two seconds, five seconds, and/or ten seconds.

DESCRIPTION OF EXAMPLES OF EMBODIMENTS

To minimize or prevent a viewer of a webpage to have to wait too long for the webpage to download and display on a screen of a computing device of the view, webpages can be pre-rendered and stored in a cache memory of a special-purpose computer. This way, the webpage can be downloaded in real-time, quickly, and directly to the computing device.

Figure 2:
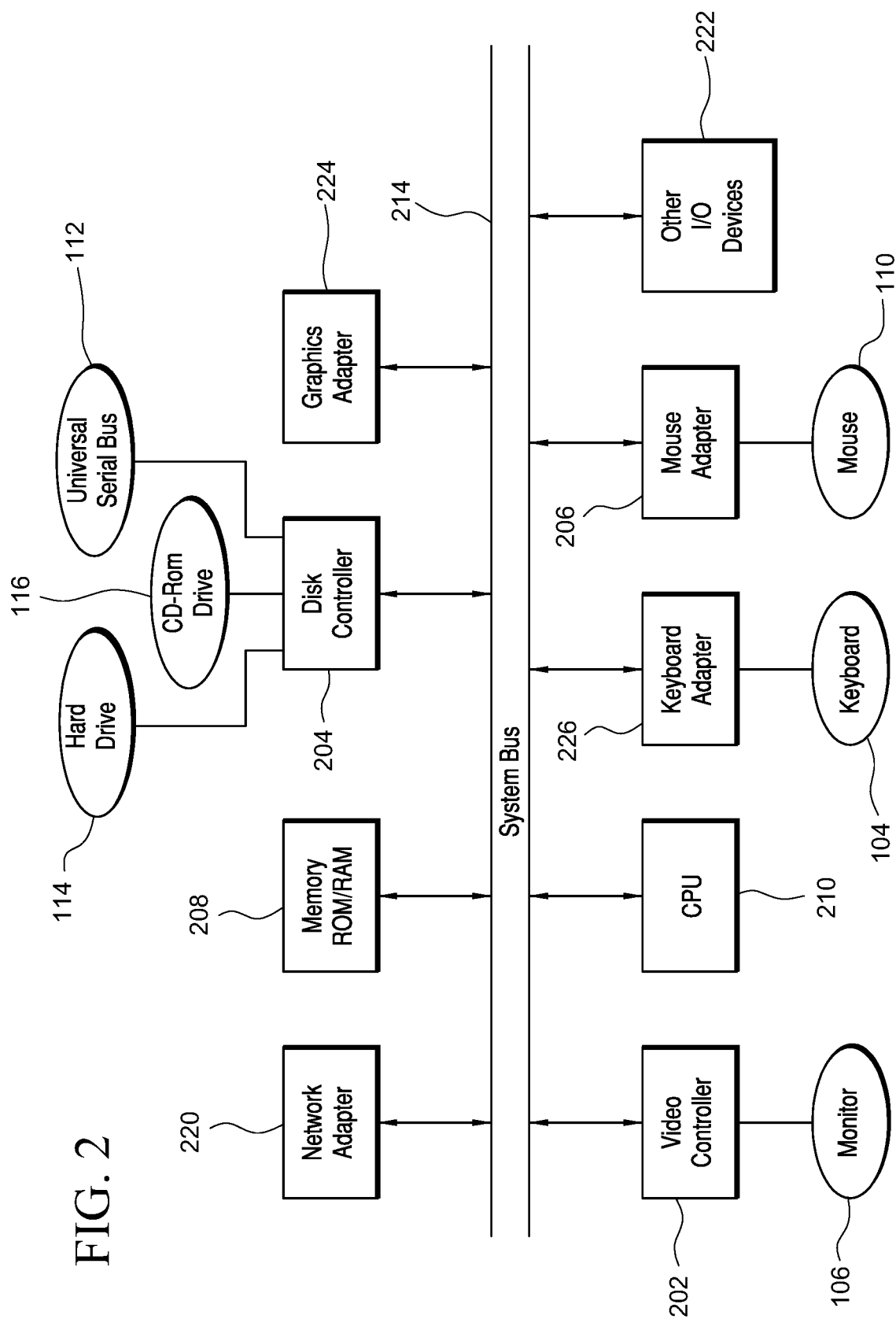
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more engines, system, applications, and/or databases, such as those described herein, to convert a general purpose computer to a special-purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
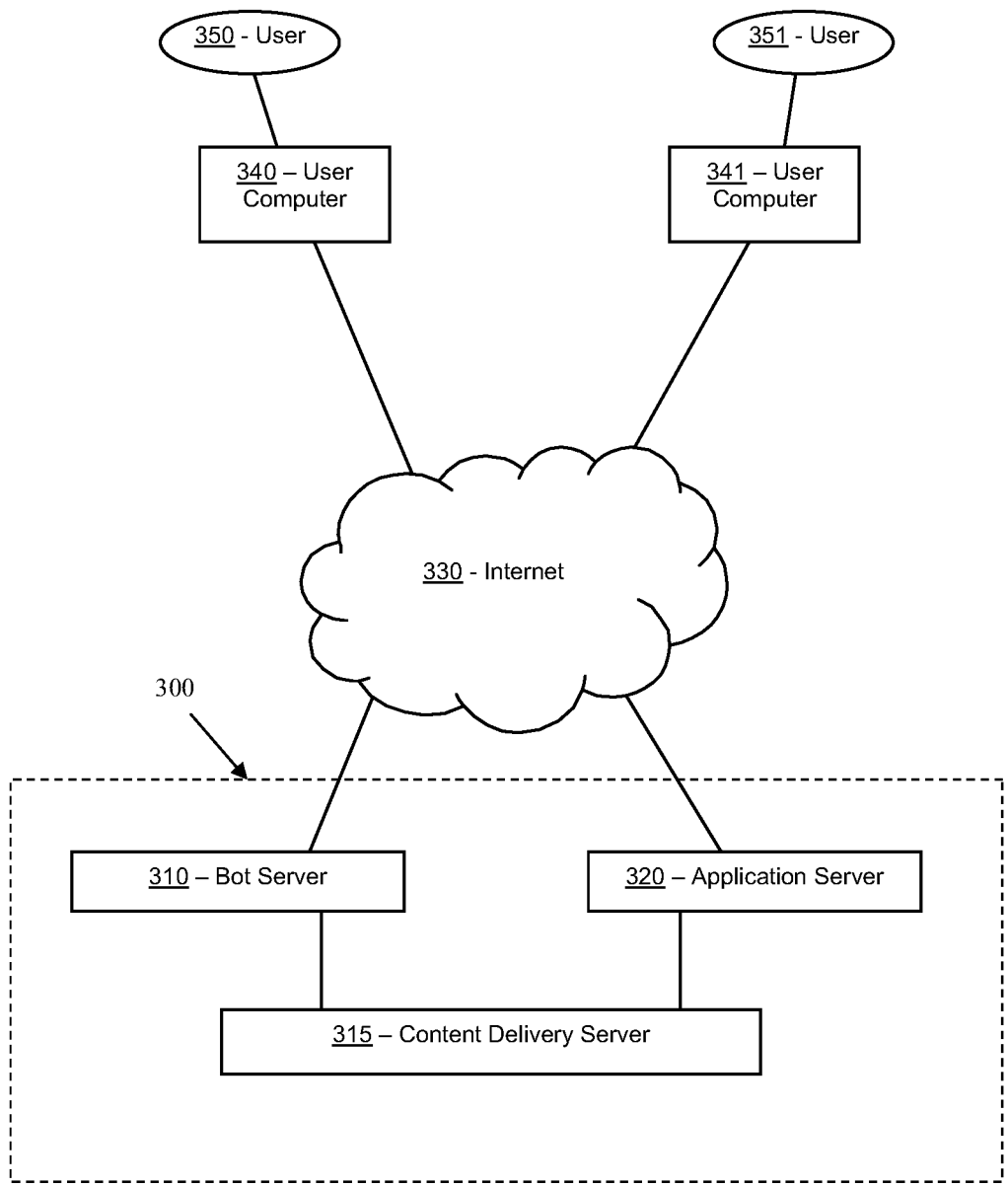
FIG. 3 illustrates a block diagram of a system, which can be employed for pre-rendering HTML webpages and storing the pre-rendered HTML webpages, according to an embodiment.

Turning ahead in the drawings, FIG. 3 illustrates a block diagram of a system 300, which can be employed for pre-rendering HTML webpages, storing the pre-rendered HTML webpages in a content delivery server (e.g., a special-purpose computer such as content delivery server 315), and/or downloading a pre-rendered HTML webpage to a computing device (e.g., a computer, a mobile device, or a smart phone, such as user computers 340, 341). System 300 is merely exemplary and embodiments of the system are not limited to the embodiments presented herein. The system can be employed in many different embodiments or examples not specifically depicted or described herein. In some embodiments, certain elements, engines, or systems of system 300 can perform various procedures, processes, and/or activities. In other embodiments, the procedures, processes, and/or activities can be performed by other suitable elements, engines, or systems of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

As shown in FIG. 3, in some embodiments, system 300 can include a bot server 310, content delivery server 315, and/or an application server 320. In several embodiments, bot server 310, content delivery server 315, and/or application server 320 can each be a computer system, such as computer system 100 (FIG. 1), as described above, and can each be a single computer, a single server, or a cluster or collection of computers or servers, or a cloud of computers or servers. In another embodiment, a single computer system can host bot server 310, content delivery server 315, and/or application server 320. In a number of embodiments, content delivery server 315 and/or application server 320 can be a special-purpose computer programed specifically to perform specific functions.

In some embodiments, content delivery server 315 can be a special-purpose computer programmed to perform specific functions and/or applications, such as, transforming a dynamically-generated HTML webpage into a static pre-rendered webpage and stored in memory (e.g., cache memory) in the special-purpose computer. In the same or different embodiments, content delivery server 315 can be a special-purpose computer programmed to perform specific functions and/or applications, such as, transforming a dynamically-generated HTML webpage into a static pre-rendered webpage and stored in memory (e.g., cache memory) in the special-purpose computer.

In some embodiments, application server 320 can be a special-purpose computer programmed to perform specific functions and/or applications such as, searching for pre-rendered webpages on content delivery server 315 that match a request for a webpage from a user device (e.g., user computer 340, 341), and transmitting the pre-rendered webpage from content delivery server 315 to a user device (e.g., user computer 340, 341).

In a number of embodiments, content delivery server 315, and/or application server 320 can be one or more special-purpose computers programed specifically to perform functions not associated with a general-purpose computer. In many embodiments, content delivery server 315 can be a content delivery network where one or more content delivery servers and/or computers can be in data communication with one another and vice-versa. In several embodiments, application server 320 can be a network of computers wherein one or more application servers and/or computers can be in data communication with one another and vice versa.

Additional details regarding bot server 310, content delivery server 315, and/or application server 320 are described herein. In these or other embodiments, bot server 310, content delivery server 315, and/or application server 320 can be located spatially apart from each other. Similarly, bot server 310 can communicate with content delivery server 315, and/or application server 320 can communicate with content delivery server 315, and/or vice versa.

In some embodiments, communication between bot server 310, content delivery server 315, and/or application server 320 can be implemented using any suitable mode of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, bot server 310, content delivery server 315, and/or application server 320 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to bot server 310, content delivery server 315, and/or application server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of bot server 310, content delivery server 315, and/or application server 320. In a similar manner, the processors and/or the non-transitory computer-readable media can be local and/or remote to each other.

In a number of embodiments, bot server 310, content delivery server 315, and/or application server 320 can be front-end and/or back-end system in an enterprise system, for a website, a search engine, a virtual retailer, etc. In many embodiments, bot server 310, content delivery server 315, and/or application server 320 each can run one or more specific applications.

In a number of embodiments, bot server 310 can be a special-purpose computer programmed specifically to perform specific functions and/or computer-run processes. In many embodiments, bot server 310 can be a headless browser sending requests (e.g., API (application programming interface) requests) to a web server of a retailer for a webpage (e.g., homepage, product page, account page). For example, in some embodiments, the specific functions and/or computer-run processes of bot server 310 can include visiting one or more webpages of a website (e.g., a virtual retailer, a physical retailer), retrieving HTML (hypertext markup language) code of one or more webpages, pre-rendering the webpages, instructing the storage of the pre-rendered webpages, transmitting script(s) for displaying the webpages, and/or other suitable applications. In several embodiments, the one or more webpages can include dynamically-generated webpages and/or statically-generated webpages.

In a number of embodiments bot server 310 and/or content delivery server 315 can pre-render HTML webpages, received from a web site, using various computer-executing programs and/or computer processes. In several embodiments, bot server 310 and/or content delivery server 315 can use various computer processes to execute computer code that can be transmitted across multiple threads (e.g., a basic unit based on an operating system that can allocate processor time) that can execute instructions concurrently. In a number of embodiments, content delivery server 315, can store pre-rendered webpages in memory (e.g., cache memory). Pre-rendered webpages stored in content delivery server 315, can be stored on one or more memory storage units (e.g., non-transitory computer readable media), which can be similar or identical to the one or more memory storage units described above with respect to computer system 100 (FIG. 1). In some embodiments, content delivery server 315 can include one or more databases. For any particular database of content delivery server 315, that particular database can be stored on a single memory storage unit or the contents of that particular database can be spread across multiple ones of the memory storage units, depending on the size of the particular database and/or the storage capacity of the memory storage units. In many embodiments, content delivery server 315 can include a structured (e.g., indexed) collection of data and/or can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Bot server 310, content delivery server 315, and/or application server 320 are merely exemplary and are not limited to the embodiments presented herein. Bot server 310, content delivery server 315, and/or application server 320 can be employed in many different embodiments or examples not specifically depicted or described herein. In some embodiments, certain elements or systems of bot server 310, content delivery server 315, and/or application server 320 can perform various procedures, processes, and/or acts. In other embodiments, the procedures, processes, and/or acts can be performed by other suitable elements or systems. In many embodiments, the systems of bot server 310, content delivery server 315, and/or application server 320 can include systems and/or engines that include computing instructions (e.g., software components) stored at non-transitory computer readable media. In other embodiments, the systems of bot server 310, content delivery server 315, and/or application server 320 can be implemented in hardware.

In some embodiments, bot server 310 and/or application server 320 can be in data communication through Internet 330 with one or more user computers, such as user computers 340 and/or 341. In some embodiments, user computers 340-341 can be used by users, such as users 350 and 351, which also can be referred to as customers, in which case, user computers 340 and 341 can be referred to as customer computers. In many embodiments, a web server can host one or more websites. For example, the web server can host a website that allows users to browse and/or search for items (e.g., products), to add items to an electronic cart, and/or to purchase items, in addition to other suitable activities. In many embodiments, bot server 310 and/or application server 320 can be in data communication with a web server through Internet 330. A web server can be employed in many different embodiments or examples not specifically depicted or described herein. In many embodiments, the web server can host a website that allows bot server 310 to browse and/or search for webpages (e.g., homepage) similar to the way users browse and/or search for webpages on a website. In some embodiments, application server 320 is the web server, in which case bot server 310 can be coupled directly to application server 320.

In some embodiments, an internal network that is not open to the public can be used for communications between the web server and bot server 310, content delivery server 315, and/or application server 320 within system 300. Accordingly, in some embodiments, bot server 310, content delivery server 315, and/or application server 320 (and/or the software used by such systems) can refer to a back end of system 300 operated by an operator and/or administrator of system 300, and in different embodiments, bot server 310, content delivery server 315, and/or application server 320 (and/or the software used by such systems) can refer to a front end of system 300, which can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

Users (e.g., 350-351) can send requests for webpages (e.g., dynamically-generated webpages) to a web server to receive a visible and/or interactive webpage in return. In many embodiments, generally a web browser sends a request (e.g., HTTP request) to a web server, the web server can provide the HTML code to and can process the HTML code into an HTML markup and build the webpage (e.g., process images, css, and javascript) to be rendered on a computer device. Depending on the complexity of the requested webpage (e.g., dynamic format, interactive format, static format, images), a web server can download a large amount of HTML code that can be suitable to render the whole requested webpage before the requested webpage can be visible and/or interactive on a user computer, such as 350,351. In many embodiments, a web browser sends a request (e.g., HTTP request) to a web server for an entire webpage and not just a fragment or portion (e.g., headers, footers) of the HTTP code. In general, conventional methods used for downloading HTML code for a webpage can include a web server using either a server-side rendering process or a client-side rendering process or a hybrid rendering process of both server-side and client-side rendering processes. (See FIGS. 6-7 and 9, as discussed below in further detail.)

In several embodiments, a web server can be programmed to use a particular process (e.g., server-side process, client-side process, hybrid process) to convert a suitable amount of HTML code that can result in rendering a requested webpage (e.g., dynamically-generated, statically-generated). In many embodiments, pre-rendering a dynamically-generated webpage and storing that webpage in a content delivery computer, such as content delivery server 315, can be used as part of computer programmed process resulting in the subsequent transmitting of a visible webpage (e.g., image) in real-time, in a pre-rendered format, directly to a user computer 340-341, which bypasses the conventional web server process (e.g., server-side rendering). In several embodiments, after the pre-rendered webpage has been stored in the content delivery computer, the content delivery computer can download the pre-rendered webpage to user computers 340, 341, for the users 350, 351, in response to requests from user computers to view that webpage.

In many embodiments, bot server 310, content delivery server 315, and/or application server 320 can respond to a user request from a user computer by sending a pre-rendered webpage (e.g., a homepage, a search page, an account page, a product display page) retrieved from the memory (e.g., cache) of a special-purpose computer (i.e., a content delivery server) to visibly display the pre-rendered webpage on the display of the user computer. In some embodiments, the pre-rendered webpage sent by application server 320 to the user computer is not the entire webpage, but rather only a portion of the webpage. In these embodiments, while application server 320 sends the portion of the webpage (i.e., the pre-rendered portion of the webpage), application server 320 can download the remaining HTML code (e.g., dynamically generated HTML code, Java Script) from the web server to build the remaining portion of the webpage and transmit it to the user computer.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In many embodiments, system 500 (FIG. 5) can be suitable to perform method 400 and/or one or more of the activities of method 400. In these or other embodiments, one or more of the activities of method 400 can be implemented as one or more computer instructions (e.g., scripts) configured to run at one or more processing modules and configured to be stored at one or more non-transitory memory storage modules. Such non-transitory memory storage modules can be part of a computer system and/or network such as bot server 310 (FIG. 3), content delivery server 315 (FIG. 3), and/or user computers 340, 341 (FIG. 3). The processing module(s) can be similar or identical to the processing module(s) described above with respect to computer system 100 (FIG. 1).

In some embodiments, method 400 can comprise an activity 401 of using a bot to periodically visit one or more dynamically-generated webpages of a website and to automatically retrieve HTML code for the one or more dynamically-generated webpages of the website. In various embodiments, the one or more dynamically-generated webpages can be the most commonly visited webpages of a website, including a homepage of the website, a search page of the website, and so on. In a number of embodiments, the one or more dynamically-generated webpages can be different homepages of the website of a retailer, where different store locations of the retailer have the different homepages. In many embodiments, a bot can periodically visit one or more dynamically-generated webpages and/or one or more statically-generated webpages, and the bot can be associated with a virtual website of a retailer and/or a website of a physical store. In several embodiments, the bot can periodically visit each of the one or more webpages (e.g., dynamically-generated webpages) at least once every hour to every six hours. In other embodiments, the bot can periodically visit each of the webpages at least once a day, once a week, once a month, and/or any suitable time period and/or time interval. In many embodiments, the bot can be programmed to visit each of the one or more webpages an "N" number of times in any period of time and/or time interval.

In several embodiments, method 400 can comprise an activity 401 of using the bot to periodically visit one or more dynamically-generated webpages of a website. In some embodiments, if a particular dynamically-generated webpage being visited by the bot has a version of the pre-rendered webpage already saved (e.g., in a content delivery server), then activity 401 also can automatically identify HTML modifications (e.g., price changes, attribute changes, images, dates) in the particular dynamically-generated webpage compared to the saved version of the pre-rendered webpage, and can automatically retrieve updated HTML code for the particular dynamically-generated webpage. In some embodiments, a bot saves HTML for webpage. In a number of embodiments, a bot can be programmed to search the top "N" number of webpages (e.g., homepages) on one or more websites hosted by a retailer (e.g., physical store, virtual retailer), such as, the top "N" most user requested webpages on the websites. In some embodiments, obtaining the top "N" most requested webpages can be derived using various algorithms and/or methods based on various metrics quantifying at least behavioral user data (e.g., click rates, purchase rates, website views, posts) of an "N" number of previous users (e.g., users 350, 351 (FIG. 3)). In many embodiments, the top "N" most requested webpages can based on determining performance levels for each of the one or more webpages based on multiple criteria (e.g., webpage views, attribute interactions, purchases associated with webpage views, geographic location). In some embodiments, the top "N" webpages of the one or more websites hosted by a retailer can be specific to geographic locations. In many embodiments, the top "N" webpages of one or more websites each can comprise different HTML code specific to that page. In several embodiments, the top "N" webpages of the one or more websites hosted by a retailer can include geographic locations of multiple physical stores of a retailer. As an example, a bot can be programmed to visit 100 of the top performing webpages of websites specific to one or more geographic regions where the bot will retrieve 100 different sets of HTML code to render each of the 100 top performing webpages. For instances, the 100 top performing webpages of a website of a retailer might include (a) 58 different home pages of the website for 58 different physical stores of the retailer, (b) 40 different search pages of the website and related to 40 of the 58 different physical stores of the retailer, (c) 1 home page of the website for users of the website who have not indicated a home or local store for the retailer, and (d) 1 search page of the website for users of the website who have not indicated a home or local store for the retailer.

In many embodiments, method 400 can continue by comprising an activity 402 of, in response to using the bot, automatically storing, in a content delivery computer, the HTML code for the one or more dynamically-generated webpages. In these embodiments, automatically storing the HTML code can transform the one or more dynamically-generated webpages from a dynamic content format into a static content format. This transformation in content format can transform the one or more dynamically-generated webpages into one or more pre-rendered webpages. In many embodiments, a bot can send a request to a web server, similar to the way a user sends a request to a web server, and the bot can receive HTML code downloaded from the web server as a dynamically-generated webpage. In various embodiments, a bot can transform (e.g., bot-rendered) the requested dynamically-generated webpage into a static format by saving the HTML code as a static image and can store the HTML code as a pre-rendered webpage (e.g., static format) in the content delivery server, such as content delivery server 315 (FIG. 3). In a number of embodiments, a bot can transform (e.g., bot-rendered) the requested dynamically-generated webpage into a static format by executing software (e.g., scripts) specifically programmed to render HTML code from a dynamic format into a static format (e.g., image) and can store the HTML code as a pre-rendered webpage (e.g., static format, image) in the content delivery server.

In many embodiments, a bot can transform (e.g., bot-rendered) the requested dynamically-generated webpage into a static format using various programming code that can include placeholders (e.g., programed code for a dynamic feature) stored in the pre-rendered webpage. In some embodiments, a dynamic feature replaced by a placeholder and stored in a static format of the pre-rendered webpage can be re-inserted and/or re-built into the pre-rendered webpage after it is displayed on a user computer, such as user computer 340, 341 (FIG. 3), using various programming coded for this specific function and/or computer-run process. As an example, these placeholders can be for dynamically-generated advertisements that are selected in real-time and not in advance of receiving the request to display the webpage. In these embodiments, as noted above, the content delivery system (e.g., content delivery computer or network of computers) also can transform the requested dynamically-generated webpage into a static format by saving the HTML code (which includes the placeholders) as a static image and storing the HTML code as a pre-rendered webpage (e.g., static format) in the memory (e.g., cache memory) of the content delivery server. In some embodiments, the content delivery system (e.g., content delivery computer or network of computers) can also transform the requested dynamically-generated webpage into a static format by executing software (e.g., scripts) specifically programmed to render HTML code (which includes the placeholders) from a dynamic format into a static format (e.g., image) and storing the HTML code as a pre-rendered webpage (e.g., static format with placeholders) in the content delivery server.

In several embodiments, automatically storing the HTML code in the content delivery server can include automatically updating the HTML code for the first one of the one or more dynamically-generated webpages when updated HTML code is available for the first one of the one or more dynamically-generated webpages. In some embodiments, automatically updating HTML code can also transform the first one of one or more dynamically-generated webpages, as modified, from the dynamic content format into the static content format such that the first one of one or more dynamically-generated webpages, as modified, can be transformed into an updated one of the one or more pre-rendered webpages. In a number of embodiments, the bot can be programmed (e.g., running a script or scripting language) to automatically transform the HTML code of these dynamically-generated webpage from a dynamic content format into a static content format (e.g., an image) such that the one or more dynamically-generated webpages are transformed into one or more pre-rendered webpages. In many embodiments, content delivery server 315 (FIG. 3), upon receiving HTML code of each dynamically-generated webpage from the bot, also can be programmed (e.g., running a script or scripting language) to transform the HTML code of each dynamically-generated webpage from a dynamic content format into a static content format such that the one or more dynamically-generated webpages are transformed into one or more pre-rendered webpages. In several embodiments, upon saving the HTML code of each dynamically-generated webpage received from the bot, content delivery server 315 (FIG. 3) also can be programmed (e.g., running a script or scripting language) to transform the HTML code of each dynamically-generated webpage from a dynamic content format into a static content format such that the one or more dynamically-generated webpages are transformed into one or more pre-rendered webpages.

In many embodiments, content delivery server 315 (FIG. 3) can be a special-purpose computer with specific computer instructions (e.g., scripts) built directly into the special-purpose computer programed to perform specific, limited functions, such as, storing the pre-rendered webpages into cache memory, transforming dynamically-generated HTML code into a pre-rendered (e.g., static image), and transmitting pre-rendered webpages to application server 320 (FIG. 3) to be piped through application server 320 directly into user computer 340, 341 (FIG. 3), among other special-purpose and/or limited functions. One advantage of using a special-purpose computer can be to reduce the amount of information that can be stored in cache memory therefore increasing the computer speed of processing the request for a pre-rendered webpage.

In some embodiments, the bot can automatically update the HTML code stored in the content delivery server 315 (FIG. 3). In many embodiments, the bot can automatically store the newly updated HTML code in the content delivery server 315 (FIG. 3). In many embodiments, later on in method 400, the bot can automatically transmit the newly updated HTML code from the cache memory of the content delivery computer to application server 320 (FIG. 3), which can act as a pipeline to transmit the HTML code to user computer 340,341 (FIG. 3). In some embodiments, application server 320 can be programmed not to include memory (e.g., cache) to allow application server to run specific computer processes that do not include storing pre-rendered pages. In several embodiments, dynamically generated pages can be fully overridden based on a schedule.

In various embodiments, method 400 can continue by comprising an activity 403 of receiving a first request for a first requested webpage from a computing device of a user to view the first requested webpage. In some embodiments, application server 320 (FIG. 3) can intercept a first request for a first requested webpage, bypassing or temporarily pausing the web server process, to conduct a search of the memory (e.g., cache memory) in content delivery server 315 (FIG. 3) for a pre-rendered webpage that can match the first requested webpage, as described below in further detail.

In many embodiments, application server 320 (FIG. 3) can be a special-purpose computer with specific computer instructions (e.g., scripts) built directly into the special-purpose computer programed to perform specific, limited functions, such as, searching the content delivery server 315 (FIG. 3) and transmitting pre-rendered webpages from the content delivery server 315 (FIG. 3) that can be piped through the application server 320 (FIG. 3) into a user computer 340, 341 (FIG. 3), among other special-purpose and limited functions. In some embodiments, application server 320 (FIG. 3) can be a special-purpose computer without memory software (e.g., cache) to allow the special-purpose computer to act as a pipeline to transmit pre-rendered webpages to a user device and/or detect that no matching pre-rendered webpages exist in the content delivery server 315 (FIG. 3). In some embodiments, in response to activity 403, when application server 320 (FIG. 3) detects the absence of any pre-rendered webpages matching a request in activity 404 (below), application server 320 can initiate conventional approaches (e.g., server-side rendering, client-side rendering) for downloading HTML code to render webpages to the user 350, 351 (FIG. 3), as described below in greater detail.

In several embodiments, method 400 can continue by comprising an activity 404 of searching the content delivery computer (e.g., content delivery server 315 (FIG. 3)) to identify a match between the first requested webpage of the first request and a first pre-rendered webpage of the one or more pre-rendered webpages stored in the content delivery computer. In many embodiments, searching the memory and/or cache memory of the content delivery server 315 (FIG. 3) can be performed by application server 320 (FIG. 3).

In some embodiments, next, method 400 can comprise an activity 405 of, upon identifying the match between the first requested webpage and the first pre-rendered webpage and in response to the first request, automatically transmitting, from the content delivery computer for display on the computing device of the user, the HTML code in the static content format for the first pre-rendered webpage. In many embodiments, automatically transmitting the HTML code for the first pre-rendered webpage, from the content delivery server 315 (FIG. 3) (e.g., special-purpose computer) for display on the computer device of the user, can include transmitting the first HTML code of the first pre-rendered webpage when the first HTML code comprises the placeholder, as described above. In these embodiments, automatically transmitting the HTML code further can include automatically transmitting second HTML code in dynamic content format of for the webpage. In these embodiments, the second HTML code can be the code for the placeholder, such as the dynamically generated advertisements. In many embodiments, searching the memory and/or cache memory of the content delivery server 315 (FIG. 3) for a second pre-rendered webpage can also be performed by application server 320 (FIG. 3).

In various embodiments, method 400 can comprise an activity 406 that could be performed instead of activity 405. In activity 406, when searching the content delivery computer (e.g., content delivery server 315 (FIG. 3) does not identify a match in activity 404, activity 406 can use a server-side rendering process to facilitate displaying, on the computing device of the user. A dynamically-generated webpage. In several embodiments, wherein when searching the content delivery computer does not identify the match, the computing instructions (e.g., script) can be configured and executed by the one or more processors, to start (e.g., initiate) a server-side rendering process to facilitate displaying, on the computing device of the user, a first one of the one or more dynamically-generated webpages matching the first requested webpage requested by the user. In many embodiments, initiating a server-side rendering process can be performed by application server 320 (FIG. 3). Server-side rendering process is described below in greater detail in FIG. 7.

In several embodiments, method 400 can comprise an activity 407 that could be performed instead of activities 405 or 406. In activity 407, when searching the content delivery computer does not identify the match, activity 407 can use a client-side rendering process to facilitate displaying, on the computing device of the user, a dynamically-generated webpage. In a number of embodiments, when searching the content delivery computer does not identify the match, activity 407 can use a client-side rendering process that can be used to facilitate displaying, on the computing device of the user, a first one of the one or more dynamically-generated webpages matching the first requested webpage requested by the user. In many embodiments, initiating a client-side rendering process can be started by application server 320 (FIG. 3) by downloading HTML code to be rendered by a browser on the user computer, such as user computer 340-341 (FIG. 3). Client-side rendering process is described below in greater detail in FIG. 8.

In some embodiments, after activity 405, 406, or 407, activity 402 can be repeated to store or update HTML code for a second webpage, and a modified version of activity 403 can be performed, namely, that a second request is received from a second or different computing device of a different user to view the second webpage, or the second request can be received from the original computing device of the original user to view the second webpage. Next a modified version of activity 404 can be performed to identify a match between the second requested webpage of the second request and the stored or updated one of the one or more pre-rendered webpages that can be stored in the content delivery computer. In a number of embodiments, after automatically storing or updating the HTML code in activity 402, as repeated, application server 320 (FIG. 3) can identify a match between the second requested webpage and the updated one of the one or more pre-rendered webpages in a modified version of activity 404. Then, upon identifying the match between the second requested webpage and the updated one of the one or more pre-rendered webpages and in response to the second request, application server 320 (FIG. 3) can automatically transmit, from the content delivery computer, a visible pre-rendered webpage for display on the second computing device of the second user (or the original computing device of the original user), where the updated HTML code can be in the static content format for the updated one of the one or more first pre-rendered webpages. In some embodiments, after application system 320 (FIG. 3) automatically transmits, from the content delivery computer, the visible pre-rendered webpage for display on the second computing device of the second user (or the original computing device of the original user), application server 320 (FIG. 3) can download HTML code that can be associated with multiple dynamic features previously not saved during the transformation of the dynamically-generated webpage into a pre-rendered webpage to render the webpage into an interactive format, as described below in greater detail in FIGS. 6 and 9. In these embodiments, application server 320 (FIG. 3) can download any remaining HTML code that can be associated with multiple placeholders reserved for multiple dynamic features of the pre-rendered webpage to render the webpage into an interactive format as described below in greater detail in FIGS. 6 and 9.

Figure 5:
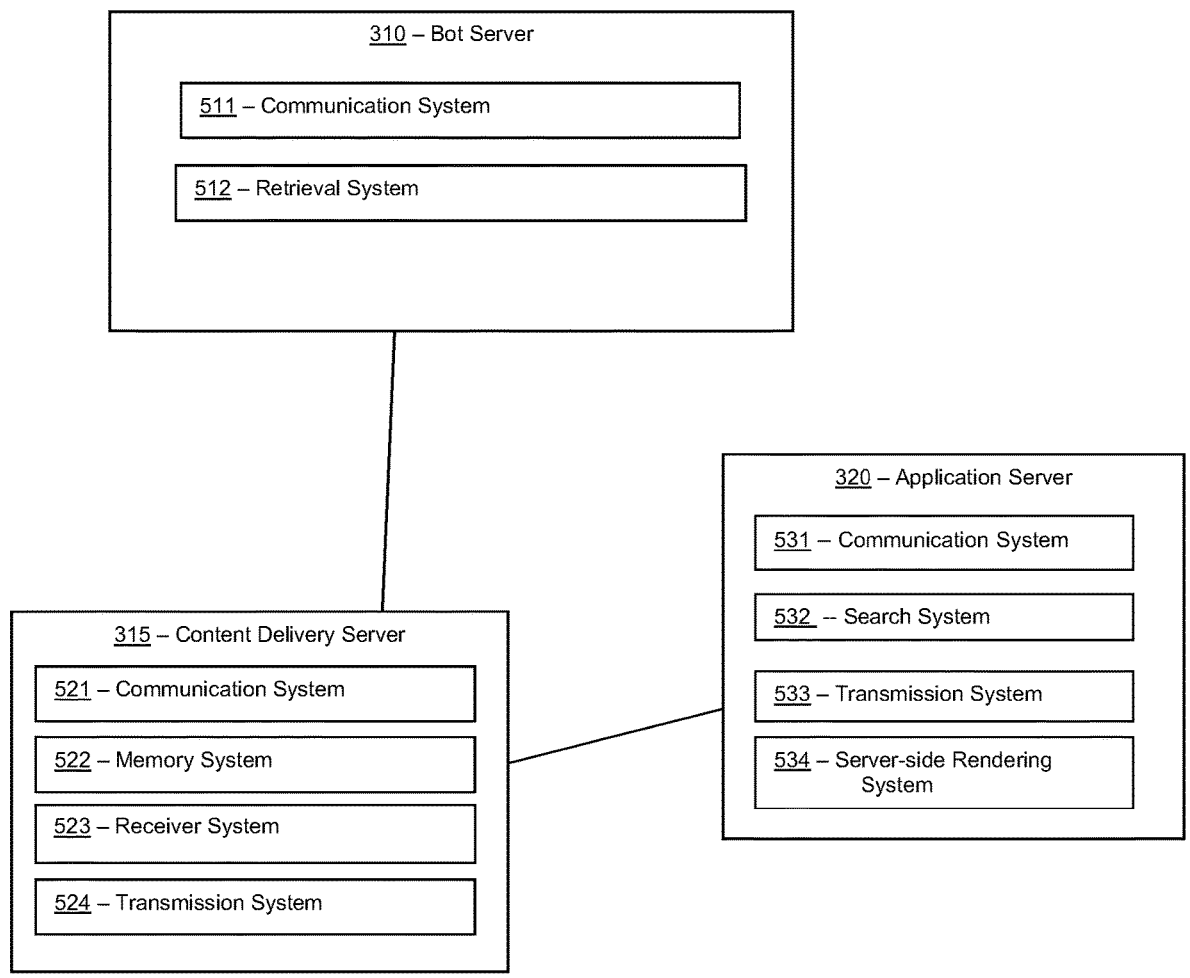
FIG. 5 illustrates a block diagram of the system of FIG. 3.

Turning ahead in the drawings, FIG. 5 illustrates a block diagram of system 300, according to an embodiment shown in FIG. 3. Bot server 310, content delivery server 315, and/or application server 320 are merely exemplary and are not limited to the embodiments presented herein. Bot server 310, content delivery server 315, and/or application server 320 can be employed in many different embodiments or examples not specifically depicted or described herein. In some embodiments, bot server 310, content delivery server 315, and/or application server 320 can perform various procedures, processes, and/or acts. In still other embodiments, one or more of the procedures, the processes, and/or the activities of system 300 can be combined or skipped. In other embodiments, the procedures, processes, and/or acts can be performed by other suitable elements or systems. In these or other embodiments, one or more of the activities of system 300 can be implemented as one or more computing instructions configured to run at one or more processors and configured to be stored at one or more non-transitory computer readable media. In many embodiments, the systems of bot server 310, content delivery server 315, and/or application server 320 can be modules of computing instructions (e.g., software modules) stored at non-transitory computer readable media. In other embodiments, the systems of bot server 310, content delivery server 315, and/or application server 320 can be implemented in hardware.

In a number of embodiments, bot server 310 can include a communication system 511. In certain embodiments, communication system 511 can at least partially perform activity 401 (FIG. 4) of, using a bot to periodically visit one or more dynamically-generated webpages of a web site and that can automatically retrieve HTML code for the one or more dynamically-generated webpages of the website. In many embodiments, communication system 511 can periodically visit one or more dynamically-generated webpages of a website that can include a homepage of the website. In many embodiments, communication system 511 can periodically visit one or more dynamically-generated webpages of a website that can include different homepages of the website for different store locations of a retailer. In several embodiments, communication system 511 can periodically, using the bot, visit each of the one or more dynamically-generated webpages at least once every one to six hours. In some embodiments, communication system 511 can, using the bot, periodically visit the one or more dynamically-generated webpages, and can use the bot to automatically identify a modification of a dynamically-generated webpage of a website and can further automatically retrieve updated HTML code for the dynamically-generated webpage of a website. In many embodiments, communication system 511 can communicate with a web server of a retailer via internet 330 (FIG. 3).

In certain embodiments, bot server 310 also can include a retrieval system 512. In certain embodiments, communication system 512 can at least partially perform activity 402 (FIG. 4) of, in response to using the bot, activity 402 can automatically store, in a content delivery computer, HTML code for the one or more dynamically-generated webpages, and can automatically store the HTML code. In many embodiments, activity 402 can transform the one or more dynamically-generated webpages from a dynamic content format into a static content format such that the one or more dynamically-generated webpages are transformed into one or more pre-rendered webpages. In some embodiments, a retrieval system 512 can, using the bot, periodically visit the one or more dynamically-generated webpages and can automatically identify modifications of a dynamically-generated webpage of the website and can automatically retrieve updated HTML code for the dynamically-generated webpage of a website.

In several embodiments, bot server 310 can include a memory system 513. In certain embodiments, memory system 513 can at least partially perform block 402 (FIG. 4) of, in response to using the bot, automatically storing, in a content delivery computer, the HTML code for the one or more dynamically-generated webpages, wherein the one or more dynamically-generated webpages are transformed into one or more pre-rendered webpages. In many embodiments, memory system 513 can automatically store the HTML code by automatically updating, in the content delivery computer, HTML code for one of the one or more dynamically-generated webpages with the updated HTML code for one of the one or more dynamically-generated webpages, wherein automatically updating the HTML code transforms the one of one or more dynamically-generated webpages, as modified, from the dynamic content format into the static content format such that one of one or more dynamically-generated webpages, as modified, can be transformed into an updated one of the one or more pre-rendered webpages. In many embodiments, memory system 513 can automatically store the HTML code and can automatically store the HTML code in a cache memory of the content delivery computer, such as content delivery system 315 (FIG. 3).

In various embodiments, content delivery server 315 can include a communication system 521. In certain embodiments, communication system 521 can be in data communication with communication system 511 of bot server 310 (FIG. 3) and/or communication system 531 of application server 320 (FIG. 3).

In many embodiments, content delivery server 315 can include a memory system 522. In certain embodiments, memory system 522 can at least partially perform activity 402 (FIG. 4), of, in response to using the bot, automatically storing, in a content delivery computer, HTML code for the one or more dynamically-generated webpages, wherein automatically storing the HTML code can transform the one or more dynamically-generated webpages from a dynamic content format into a static content format such that the one or more dynamically-generated webpages can be transformed into one or more pre-rendered webpages. In many embodiments, memory system 513 can automatically update, in the content delivery computer, HTML code for one of the one or more dynamically-generated webpages that can include some updated HTML code for one of the one or more dynamically-generated webpages. In several embodiments, memory system 522 can automatically transform updated HTML code of one or more dynamically-generated webpages, as modified, from the dynamic content format into the static content format such that the one of one or more dynamically-generated webpages, as modified, can be transformed into an updated one of the one or more pre-rendered webpages. In many embodiments, memory system 513 can automatically store HTML code in a cache memory (e.g., memory) in the content delivery computer.

In some embodiments, content delivery server 315 can include a receiver system 523, to receive HTML code from bot server 310 (FIG. 3) and to save the HTML code into memory system 522. In certain embodiments, receiver system 522 can automatically transform, or assist in the transformation of, the one or more dynamically-generated webpages from a dynamic content format into a static content format such that the one or more dynamically-generated webpages are transformed into one or more pre-rendered webpages and stored in memory system 522.

In some embodiments, content delivery server 315 can include a transmission system 524. In certain embodiments, transmission system 524 can at least partially perform activity 405 (FIG. 4) of, upon identifying the match between the requested webpage and the pre-rendered webpage, transmission system 524 can automatically transmit a pre-rendered webpage matching a request by a user, such as user 350,351 (FIG. 3) from the content delivery computer for display on the computing device of the user, where the HTML code of the pre-rendered webpage is in the static content format.

In many embodiments, application server 320 can include a communication system 531. In certain embodiments, communication system 521 can at least partially perform activity 403 (FIG. 4), of receiving a request for a webpage from a computing device of a user. In some embodiments, communication system 531 can be in data communication with communication system 521 of content delivery server 315 and with user computers, such as user computers 340,341 (FIG. 3). In several embodiments, communication system 521 can include, after automatically updating the HTML code, receiving a second request for a second requested webpage from a second computing device of a second user. In a number of embodiments, communication system 521 can also include, after automatically updating the HTML code, searching the content delivery computer to identify a match between the second requested webpage of the second request and the updated one of the one or more pre-rendered webpages stored in the content delivery computer, such as content delivery server 315 (FIG. 3). In many embodiments, communication system 521, can include, after automatically updating HTML code, and upon identifying the match between the second requested webpage and the updated one of the one or more pre-rendered webpages and in response to the second request, automatically transmit, from the content delivery computer for display on the second computing device of the second user, the updated HTML code in the static content format for the updated pre-rendered webpage.

In many embodiments, application server 320 can include a search system 532. In certain embodiments, search system 532 can at least partially perform activity 404 (FIG. 4), of searching the content delivery computer to identify a match between the requested webpage of the request and a pre-rendered webpage of one or more pre-rendered webpages stored in a content delivery computer.

In many embodiments, application server 320 can include a transmission system 533. In certain embodiments, transmission system 533 can at least partially perform activity 405 (FIG. 4), of, upon identifying a match between the a requested webpage and a pre-rendered webpage in response to a request and can automatically transmit, working as a pipeline (e.g., transmitting HTML code in a pre-rendered format) from a content delivery computer directly to a computing device of the user, such as user computer 340, 341 (FIG. 3), as noted above for activity 405. In a number of embodiments, transmission system 533 can at least partially perform activity 407 (FIG. 4) when searching the content delivery computer does not identify the match, transmission system 533 can download HTML code, including JavaScript, of the webpage to a browser of a client device to initiate a client-side rendering process that can be used to facilitate displaying, on the computing device of the user, a one or more dynamically-generated webpages as requested by the request.

In several embodiments, application server 320 can include a server-side rendering system 534. In certain embodiments, server-side rendering system 521 can at least partially perform activity 406 (FIG. 4), of when searching the content delivery computer does not identify the match, the computing instructions can be programmed to use a server-side rendering process to facilitate displaying, on the computing device of the user, a dynamically-generated webpage requested by a request.

Figure 6:
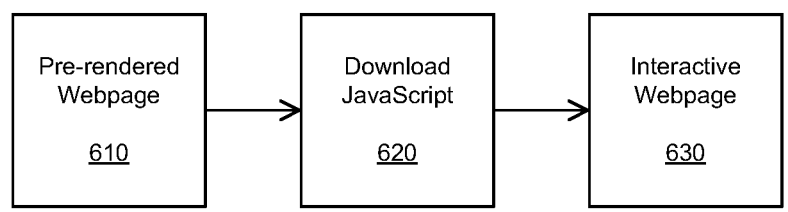
FIG. 6 illustrates a flow diagram for a method, according to another embodiment.

Proceeding to the next drawing, FIG. 6 illustrates a flow diagram of an embodiment for a activity 405 (FIG. 4) of, upon identifying a match between a requested webpage and a pre-rendered webpage, automatically transmit, from the content delivery computer (e.g., content delivery server 315 (FIG. 3)) for display on the computing device of the user, the HTML code in the static content format for a pre-rendered webpage. Activity 405 is merely exemplary and is not limited to the embodiments presented herein. Activity 405 can be employed in many different embodiments or examples not specifically depicted or described herein. In some embodiments, the procedures, the processes, and/or the activities of activity 405 can be performed in the order presented. In other embodiments, the procedures, the processes, and/or the activities of activity 405 can be performed in any suitable order. In still other embodiments, one or more of the procedures, the processes, and/or the activities of method 405 can be combined or skipped. In many embodiments the procedures, processes, and/or activities of activity 405 can be performed as an offline process (e.g., outside of making a request to a web server).

Referring to FIG. 6, activity 405 can include a block 610 illustrating an embodiment depicting a pre-rendered webpage, such as the one or more dynamically-generated webpages that can be transformed into one or more pre-rendered webpages as shown in activity 402 (FIG. 4), that can be automatically transmitted by the application server 320 (FIG. 3) to a user computer, such as user computer 340, 341 (FIG. 3), where the pre-rendered webpage is visibly displayed in a static format on a user computer. In some embodiments, when a pre-rendered webpage can be visibly displayed in a static format on a user computer, the flow diagram can proceed to block 620, where application server can download JavaScript for the requested webpage, such as the pre-rendered webpage displayed. As an example, the JavaScript can be for an advertisement on the webpage that is selected in real-time and not before receiving a request to display the webpage. In many embodiments, when the application server has downloaded JavaScript for the requested webpage on the user computer, the webpage can be used as an interactive webpage in block 630.

Figure 7:
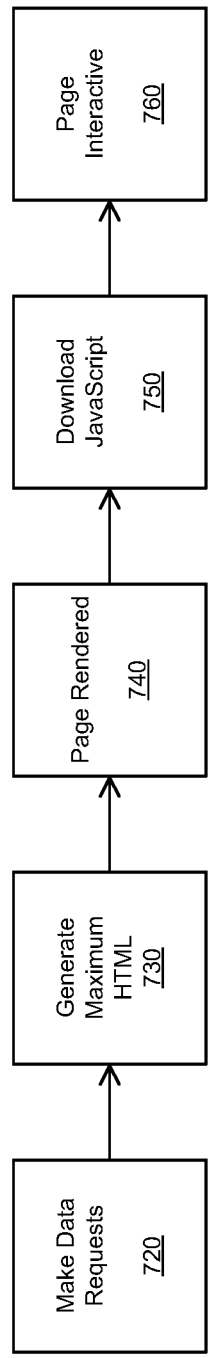
FIG. 7 illustrates a flow diagram for a method, according to another embodiment.

Turning ahead in the drawings, FIG. 7 illustrates a flow diagram of an embodiment for activity 406 (FIG. 4) of, when application server 320 (FIG. 3) searches the content delivery computer and does not identify the match, computing instructions can be configured for the application server to execute, by one or more processors, a server-side rendering process that can facilitate display on the computing device (e.g., user computer 340, 641 (FIG. 3)) of a user, a dynamically-generated webpage matching a requested webpage requested by the user. In several embodiments, when application server 320 (FIG. 3) searches the content delivery computer and does not identify a match, computing instructions can be configured for application server to execute, by one or more processors, to transmit the request to a web server that can process the request using a server-side rendering process that can facilitate display on the computing device (e.g., user computer 340, 641 (FIG. 3)) of a user, a dynamically-generated webpage matching a requested webpage requested by the user. Activity 406 is merely exemplary and is not limited to the embodiments presented herein. Activity 406 can be employed in many different embodiments or examples not specifically depicted or described herein. In some embodiments, the procedures, the processes, and/or the activities of activity 406 can be performed in the order presented. In other embodiments, the procedures, the processes, and/or the activities of activity 406 can be performed in any suitable order. In still other embodiments, one or more of the procedures, the processes, and/or the activities of method 406 can be combined or skipped.

In many embodiments, activity 406 can include a block 720 of, after receiving a user 350, 351 (FIG. 3) request that can be from a user computer 340, 341 (FIG. 3) for a webpage, initiating a server-side rendering process in response to the request that begins with the application server 320 (FIG. 3) making a request, using a processor, to a web server for the requested webpage. In some embodiments, application server can revert or default back to a web server to initiate a server-side rendering process in response to the request where the web server, using a processor, sends a request to the website for the requested webpage. In a number of embodiments, activity 406 can include block 730 of application server 320 and/or a web server generating maximum HTML code whereupon application server and/or web server can convert the HTML files on the server-side into usable information for a browser on the user device. In many embodiments, activity 406 can include block 740, of rendering a webpage when the browser receives the HTML files, the browser can display the entire webpage (e.g., dynamic format, static format) on a screen of a user computer, such as user computer 340, 341 (FIG. 3). In some embodiments, activity 406 can include block 750 of downloading JavaScript of the HTML files to the browser of a user computer. In a number of embodiments, activity 406 can include block 760 of completing an interactive webpage after the JavaScript of the HTML files have been downloaded to the browser of a user.

Figure 8:
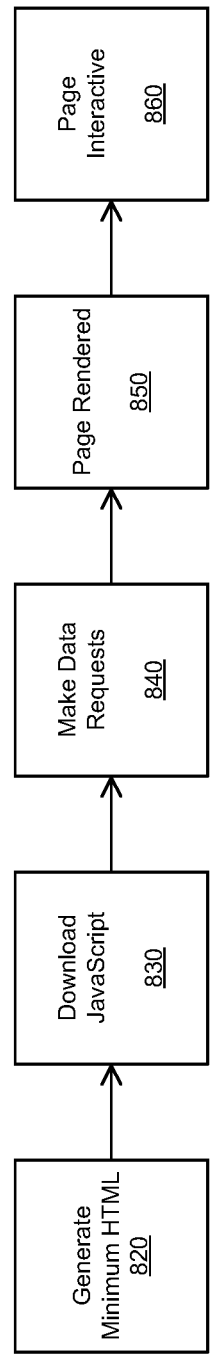
FIG. 8 illustrates a flow diagram for a method, according to another embodiment.

Proceeding to the next drawing, FIG. 8 illustrates a flow diagram of an embodiment for a activity 407 (FIG. 4) of, when application server 320 (FIG. 3) searches the content delivery computer and does not identify a match, computing instructions can be configured for application server to execute, by one or more processors, to download a minimum amount of HTML code and JavaScript file consistent, initiating a client-side rendering process that can facilitate display, on the computing device (e.g., user computer 340, 641 (FIG. 3) of a user, a dynamically-generated webpage matching a requested webpage as requested by a user. In several embodiments, when application server 320 (FIG. 3) searches the content delivery computer and does not identify a match, computing instructions can be configured for application server to execute, by one or more processors, code programed to transmit the request to a web server that can process the request consistent with a client-side rendering process that can facilitate display, on the computing device (e.g., user computer 340, 641 (FIG. 3) of a user, a dynamically-generated webpage matching a requested webpage as requested by the user. Activity 407 is merely exemplary and is not limited to the embodiments presented herein. Activity 407 can be employed in many different embodiments or examples not specifically depicted or described herein. In some embodiments, the procedures, the processes, and/or the activities of activity 407 can be performed in the order presented. In other embodiments, the procedures, the processes, and/or the activities of activity 407 can be performed in any suitable order. In still other embodiments, one or more of the procedures, the processes, and/or the activities of activity 407 can be combined or skipped.

In many embodiments, activity 407 can include a block 820, after receiving a user (e.g., user 350, 351 (FIG. 3) request that can be from a user computer (e.g., user computer 340, 341 (FIG. 3) for a webpage, application server 320 (FIG. 3) and/or a web server, that can generate a minimum amount of HTML code of an HTML document. In a number of embodiments, activity 407 can include block 830 of downloading JavaScript for the minimum of amount of HTML code of an HTML document to a browser of a user computer. In several embodiments, activity 407 can include block 840 of a browser sending data requests to a web server hosting the website for a requested webpage. In some embodiments, activity 407 can include block 850 of rendering a webpage when the browser receives the JavaScript and the minimum HTML content where the browser can display the entire webpage (e.g., dynamic format, static format) on a screen of a user computer, such as 340, 341 (FIG. 3). In a number of embodiments, activity 406 can include block 860 of a browser completing an interactive webpage after the JavaScript and the HTML files have been downloaded to the browser of a user.

Figure 9:
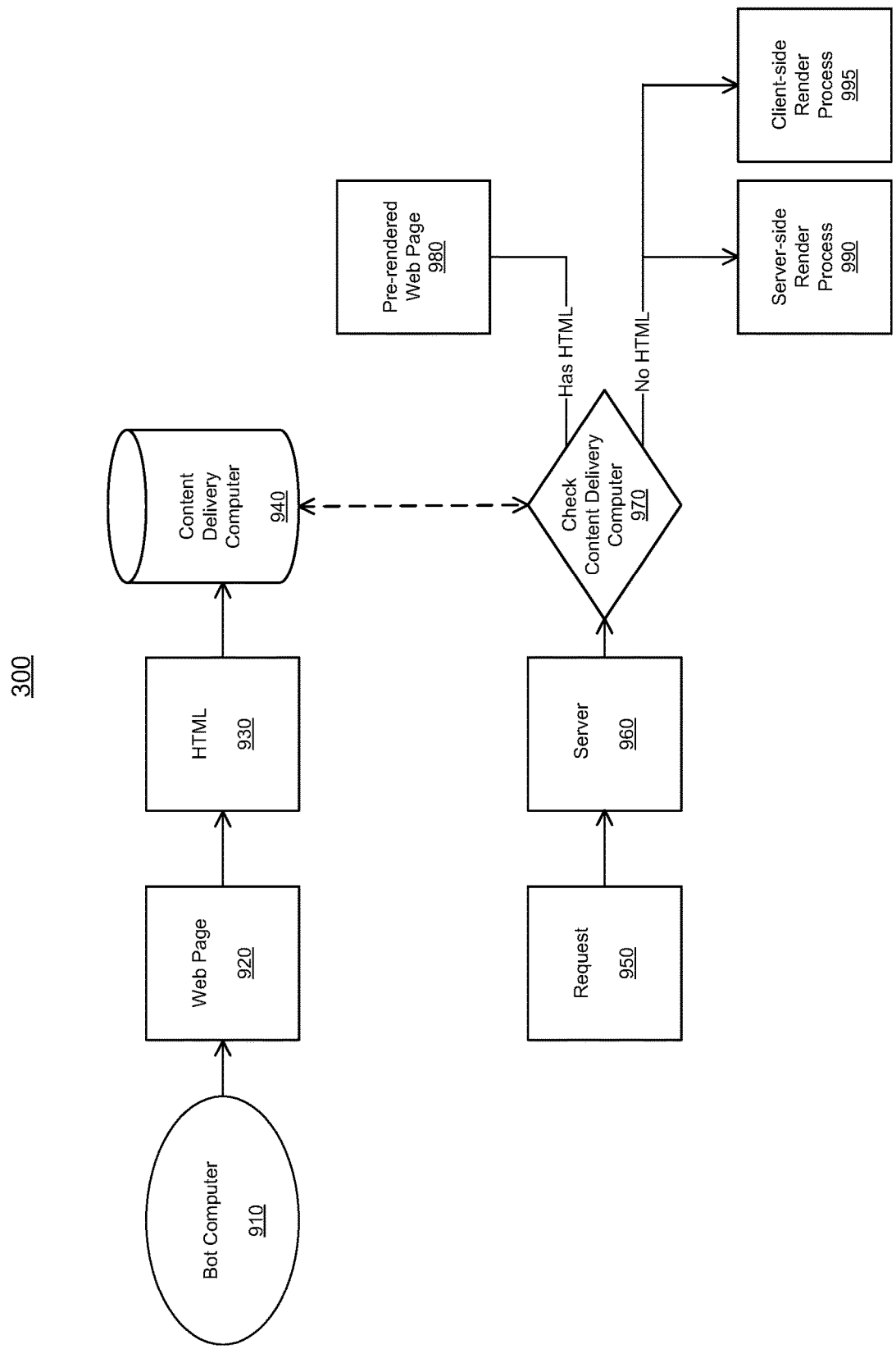
FIG. 9 illustrates a flow diagram for a method, according to another embodiment.

Turning ahead in the drawings, FIG. 9 illustrates a flow diagram for an embodiment of system 300. System 300 is merely exemplary and is not limited to the embodiments presented herein. System 300 can be employed in many different embodiments or examples not specifically depicted or described herein. In some embodiments, the procedures, the processes, and/or the activities of system 300 can be performed in the order presented. In other embodiments, the procedures, the processes, and/or the activities of system 300 can be performed in any suitable order. In still other embodiments, one or more of the procedures, the processes, and/or the activities of system 300 can be combined or skipped. In many embodiments the procedures, processes, and/or activities of system 300 can be performed as an offline process (e.g., outside of making a request to a web server).

In many embodiments, system 300 can include a block 910 of a bot computer, such as bot server 310 (FIG. 3), to perform at least activity 401 (FIG. 4), of using a bot to periodically visit one or more dynamically-generated webpages of a website. In some embodiments, block 910 can automatically retrieve HTML code for the one or more dynamically-generated webpages of the website. Bot computer 910 can also send a request to a web server for a webpage, such as a user computer 340,341 (FIG. 3). In a number of embodiments, after block 910, system 300 can include block 920 of, in response to sending a request to a web server, receiving a webpage (e.g., dynamically-generated webpage), as shown in activity 401 (FIG. 4), as described above in further detail. In several embodiments, after block 920, system 300 can include block 930 of retrieving HTML code of a webpage, as also shown in activity 401 (FIG. 4), as described above in further detail. In some embodiments, after block 930, system 300 can include block 940 of storing pre-rendered webpages in a content delivery computer, such as content delivery server 315 (FIG. 3), as shown in activity 402 (FIG. 4), and as described above in further detail. In various embodiments, system 300 also can include block 950 of, application server 320 (FIG. 3), receiving a user 350, 351 (FIG. 3) request that can be sent from a user computer, such as user computer 340, 341 (FIG. 3) for a webpage, which is described above in further detail with respect to activity 403 (FIG. 4). In many embodiments, after block 950, system 300 can include block 960 of application server 320 (FIG. 3) of searching the content delivery computer, that can identify a match between a requested webpage of a request and a pre-rendered webpage of one or more pre-rendered webpages stored in a content delivery computer, which is described above in further detail with respect to activity 404 (FIG. 4). In a number of embodiments, after block 960, system 300 can include block 970 of identifying whether a requested webpage matches a pre-rendered webpage stored in the content delivery computer, as shown in activity 405 (FIG. 4), as described above in further detail. In several embodiments, after block 970, system 300 can include block 980 of application server, upon identifying a match between a requested webpage and a pre-rendered webpage, facilitating transmission of the pre-rendered webpage from a content deliver computer (in block 940) directly to user computer, in real-time, as shown in activity 405 (FIG. 4), in further detail above. In some embodiments, also after block 970, system 300 can include block 990 of, when searching the content delivery computer does not identify a match in block 970, application server 320 (FIG. 3) initiating a server-side rendering process that can facilitate displaying, on the computing device of the user, a dynamically-generated webpage requested by a request (in block 950). In various embodiments, also after block 970, system 300 can include block 995 of, when searching the content delivery computer does not identify a match in block 970, application server 320 (FIG. 3) initiating a download of minimum HTML code including one or more JavaScript files for the webpage as part of a client-side rendering process can be used to facilitate displaying, on the computing device of the user, a dynamically-generated webpage as requested by a request (in block 950).

Each time a user requests a webpage to be displayed on a user device using a server-side rendering process, the HTML code can be uploaded to a web server to be converted into meaningful information before it can be sent to a web browser of the user device. Further each time a user requests a webpage to be displayed on a user device using a client-side rendering process, a minimum amount of HTML code along with one or more JavaScript files (and not the entire content of the webpage in HTML code) can be downloaded to a client device where the webpage can be completed in a rendering process using a browser of a client device. Some experimental results have shown that the techniques described herein can save approximately 0 to 40 seconds during the download and pre-rendering process to display a visible webpage (e.g., first meaningful paint). One advantage of pre-rendering a webpage outside of the web server system is a shorter delay (if any humanly observable delay) to viewing the webpage on a user device requesting the webpage. Another advantage of pre-rendering the webpage outside of the web server system can be reducing the computing cost of generating HTML. When a webpage is pre-rendered, the computing cost of generating the HTML can be paid one time and the HTML can then be delivered to any number of users. Server-side rendering can require more real-time computer resources than pre-rendering a webpage.

In some embodiments, returning to FIG. 3, bot server 310, content delivery server 315, and/or application server 320 can increase the processing speed of the computer system by intercepting a request for a webpage, using a special-purpose computer, and can provide a pre-rendered page directly to the user computer bypassing the web server when a pre-rendered page that matches the request is found. One advantage of using a pre-rendered webpage stored in a content delivery server 315, to respond to a user request to view a webpage can be the increased speed in which the computer system can render a visible webpage on a user computer. Another advantage of using a pre-rendered webpage stored by the content delivery server 315 can be a reduction in the amount of computer resources used to respond to the request since a web server does not have to run processes and/or computer-runs to render a webpage to the user. Additionally, the pre-rendered webpages are stored in a memory of a content delivery system using a computer process performed outside of the web server computer run time and/or an offline process that does not affect and/or compete with the multiple computer functions of a web server responding to multiple requests. In many embodiments, the techniques described herein can provide several technological improvements by freeing up processors to do perform other work.

A number of embodiments include a system. The system can include one or more processors and one or more non-transitory computer-readable media storing computing instructions configured, when executed by the one or more processors. The system can using a bot, periodically visit one or more dynamically-generated webpages of a website and to automatically retrieve HTML code for the one or more dynamically-generated webpages of the web site. The system can also include, in response to using the bot, automatically storing in a content delivery computer, HTML code for the one or more dynamically-generated webpages. The system can transform the HTML code from the one or more dynamically-generated webpages c from a dynamic content format into a static content format such that the one or more dynamically-generated webpages are transformed into one or more pre-rendered webpages. The system can receive a first request for a first requested webpage from a computing device of a user to view the first requested webpage. The system can additionally perform searching the content delivery computer to identify a match between the first requested webpage of the first request and a first pre-rendered webpage of the one or more pre-rendered webpages stored in the content delivery computer. Upon identifying the match between the first requested webpage and the first pre-rendered webpage and in response to the first request, the system can automatically transmit, from the content delivery computer for display on the computing device of the user, the HTML code in the static content format for the first pre-rendered webpage. Other embodiments are disclosed.

Various embodiments include a method. The method can be implemented via execution of computing instructions configured to run at one or more processors and stored at one or more non-transitory computer-readable media. The method can using a bot, periodically visit one or more dynamically-generated webpages of a website and to automatically retrieve HTML code for the one or more dynamically-generated webpages of the website. The method can also include, in response to using the bot, automatically storing in a content delivery computer, HTML code for the one or more dynamically-generated webpages. The method can transform the one or more dynamically-generated webpages from a dynamic content format into a static content format such that the one or more dynamically-generated webpages are transformed into one or more pre-rendered webpages. The method can receive a first request for a first requested webpage from a computing device of a user to view the first requested webpage. The method can additionally perform searching the content delivery computer to identify a match between the first requested webpage of the first request and a first pre-rendered webpage of the one or more pre-rendered webpages stored in the content delivery computer. Upon identifying the match between the first requested webpage and the first pre-rendered webpage and in response to the first request, the method can automatically transmit, from the content delivery computer for display on the computing device of the user, the HTML code in the static content format for the first pre-rendered webpage. Other embodiments are disclosed.

Although downloading pre-rendered webpages to a client device stored in a special-purpose computer (e.g., content delivery server) has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-9 may be modified, and that the foregoing discussion of certain of these embodiments does not necessarily represent a complete description of all possible embodiments. For example, one or more of the procedures, processes, or activities of FIGS. 4-9 may include different procedures, processes, and/or activities and be performed by many different engines, in many different orders, and/or one or more of the procedures, processes, or activities of FIGS. 4-9 may include one or more of the procedures, processes, or activities of another different one of FIGS. 4-9.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed:

1. A system comprising:

one or more processors; and one or more non-transitory computer-readable media storing computing instructions configured, when executed by the one or more processors, to perform:

using a bot to periodically visit one or more dynamically-generated webpages of a website to (i) automatically retrieve HTML code for the one or more dynamically-generated webpages of the website and (ii) to automatically identify modifications of a first one of the one or more dynamically-generated webpages of the website;

in response to using the bot, automatically storing, in a content delivery computer, the HTML code for the one or more dynamically-generated webpages, wherein automatically storing the HTML code transforms the one or more dynamically-generated webpages from a dynamic content format into a static content format such that the one or more dynamically-generated webpages are transformed into one or more pre-rendered webpages;

receiving a first request for a first requested webpage from a computing device of a user to view the first requested webpage;

searching the content delivery computer to identify a match between the first requested webpage of the first request and a first pre-rendered webpage of the one or more pre-rendered webpages stored in the content delivery computer;

upon identifying the match between the first requested webpage and the first pre-rendered webpage and in response to the first request, automatically transmitting, from the content delivery computer for display on the computing device of the user, the HTML code in the static content format for the first pre-rendered webpage;

automatically updating the HTML code, in the content delivery computer, for the one or more dynamically-generated webpages with the HTML code, as updated, for the first one of the one or more dynamically-generated webpages to transform the first one of the one or more dynamically-generated webpages, as modified, from the dynamic content format into the static content format such that the first one of the one or more dynamically-generated webpages, as modified, is transformed into an updated one of the one or more pre-rendered webpages, wherein:

automatically storing the HTML code further comprises the automatically updating the HTML code for the first one of the one or more dynamically-generated webpages;

receiving a second request for a second requested webpage from a second computing device of a second user; and upon identifying a match between the second requested webpage and the updated one of the one or more pre-rendered webpages and in response to the second request, automatically transmitting, from the content delivery computer for display on the second computing device of the second user, the HTML code, as updated, in the static content format for the one of one or more first pre-rendered webpages, as updated.

2. The system of claim 1, wherein the one or more dynamically-generated webpages comprise a homepage of the website.

3. The system of claim 1, wherein:
the one or more dynamically-generated webpages comprise different homepages of the website for different store locations of a retailer.

4. The system of claim 1, wherein:
using the bot further comprises using the bot to visit each of the one or more dynamically-generated webpages at least once every six hours.

5. The system of claim 1, wherein:
using the bot to periodically visit the one or more dynamically-generated webpages further comprises using the bot to automatically retrieve the HTML code, as updated, for the first one of the one or more dynamically-generated webpages of the website.

6. The system of claim 5, wherein:
upon automatically updating the HTML code and upon receiving the second request:
searching the content delivery computer to identify the match between the second requested webpage of the second request and the updated one of the one or more pre-rendered webpages stored in the content delivery computer.

7. The system of claim 1, wherein:
automatically storing the HTML code further comprises automatically storing the HTML code in cache memory of the content delivery computer; and
automatically transmitting the HTML code further comprises automatically transmitting the HTML code from the cache memory of the content delivery computer.

8. The system of claim 1, wherein:
automatically storing the HTML code further comprises automatically storing, in the content delivery computer, first HTML code for portions of the one or more dynamically-generated webpages, wherein automatically storing the first HTML code transforms the portions of the one or more dynamically-generated webpages from a dynamic content format into a static content format such that the portions of the one or more dynamically-generated webpages are transformed into portions of one or more pre-rendered webpages; and
automatically transmitting the HTML code further comprises:
automatically transmitting, from the content delivery computer for display on the computer device of the user, the first HTML code in the static content format of a first portion of the first pre-rendered webpage; and
automatically transmitting second HTML code in dynamic content format of a second portion of the first pre-rendered webpage.

9. The system of claim 1, wherein when searching the content delivery computer does not identify the match, the computing instructions are further configured, when executed by the one or more processors, to perform:
using a server-side rendering process to facilitate displaying, on the computing device of the user, one of the one or more dynamically-generated webpages matching the first requested webpage requested by the user.

10. The system of claim 1, wherein when searching the content delivery computer does not identify the match:
a client-side rendering process is used to facilitate displaying, on the computing device of the user, one of the one or more dynamically-generated webpages matching the first requested webpage requested by the user.

11. A method being implemented via execution of computing instructions configured to run at one or more processors and stored at one or more non-transitory computer-readable media, the method comprising:
using a bot to periodically visit one or more dynamically-generated webpages of a website to (i) automatically retrieve HTML code for the one or more dynamically-generated webpages of the website and (ii) to automatically identify modifications of a first one of the one or more dynamically-generated webpages of the website;
in response to using the bot, automatically storing, in a content delivery computer, the HTML code for the one or more dynamically-generated webpages, wherein automatically storing the HTML code transforms the one or more dynamically-generated webpages from a dynamic content format into a static content format such that the one or more dynamically-generated webpages are transformed into one or more pre-rendered webpages;
receiving a first request for a first requested webpage from a computing device of a user to view the first requested webpage;
searching the content delivery computer to identify a match between the first requested webpage of the first request and a first pre-rendered webpage of the one or more pre-rendered webpages stored in the content delivery computer;
upon identifying the match between the first requested webpage and the first pre-rendered webpage and in response to the first request, automatically transmitting, from the content delivery computer for display on the computing device of the user, the HTML code in the static content format for the first pre-rendered webpage;
automatically updating the HTML code, in the content delivery computer, for the one or more dynamically-generated webpages with the HTML code, as updated, for the first one of the one or more dynamically-generated webpages to transform the first one of the one or more dynamically-generated webpages, as modified, from the dynamic content format into the static content format such that the first one of the one or more dynamically-generated webpages, as modified, is transformed into an updated one of the one or more pre-rendered webpages, wherein:
automatically storing the HTML code further comprises the automatically updating the HTML code for the first one of the one or more dynamically-generated webpages;
receiving a second request for a second requested webpage from a second computing device of a second user; and
upon identifying a match between the second requested webpage and the updated one of the one or more pre-rendered webpages and in response to the second request, automatically transmitting, from the content delivery computer for display on the second computing device of the second user, the HTML code, as updated, in the static content format for the one of one or more first pre-rendered webpages, as updated.

12. The method of claim 11, wherein the one or more dynamically-generated webpages comprise a homepage of the website.

13. The method of claim 11, wherein:
the one or more dynamically-generated webpages comprise different homepages of the website for different store locations of a retailer.

14. The method of claim 11, wherein:
using the bot further comprises using the bot to visit each of the one or more dynamically-generated webpages at least once every six hours.

15. The method of claim 11, wherein:
using the bot to periodically visit the one or more dynamically-generated webpages further comprises using the bot to automatically retrieve the HTML code, as updated, for the first one of the one or more dynamically-generated webpages of the website.

16. The method of claim 15, wherein:
upon automatically updating the HTML code and upon receiving the second request:
  searching the content delivery computer to identify the match between the second requested webpage of the second request and the updated one of the one or more pre-rendered webpages stored in the content delivery computer.

17. The method of claim 11, wherein:
automatically storing the HTML code further comprises automatically storing the HTML code in cache memory of the content delivery computer; and
automatically transmitting the HTML code further comprises automatically transmitting the HTML code from the cache memory of the content delivery computer.

18. The method of claim 11, wherein:
automatically storing the HTML code further comprises automatically storing, in the content delivery computer, first HTML code for portions of the one or more dynamically-generated webpages, wherein automatically storing the first HTML code transforms the portions of the one or more dynamically-generated webpages from a dynamic content format into a static content format such that the portions of the one or more dynamically-generated webpages are transformed into portions of one or more pre-rendered webpages; and
automatically transmitting the HTML code further comprises:
  automatically transmitting, from the content delivery computer for display on the computer device of the user, the first HTML code in the static content format of a first portion of the first pre-rendered webpage; and
  automatically transmitting second HTML code in dynamic content format of a second portion of the first pre-rendered webpage.

19. The method of claim 11, wherein when searching the content delivery computer does not identify the match, the computing instructions are further configured, when executed by the one or more processors, the method further comprising:
using a server-side rendering process to facilitate displaying, on the computing device of the user, one of the one or more dynamically-generated webpages matching the first requested webpage requested by the user.

20. The method of claim 11, wherein when searching the content delivery computer does not identify the match:
a client-side rendering process is used to facilitate displaying, on the computing device of the user, one of the one or more dynamically-generated webpages matching the first requested webpage requested by the user.

* * * * *